Sept. 4, 1962     E. D. HEBERLING     3,052,875
DECOMMUTATOR

Filed Oct. 2, 1961     2 Sheets-Sheet 1

EMORY D. HEBERLING
*INVENTOR.*

BY *J. M. St. Amand*
ATTORNEY

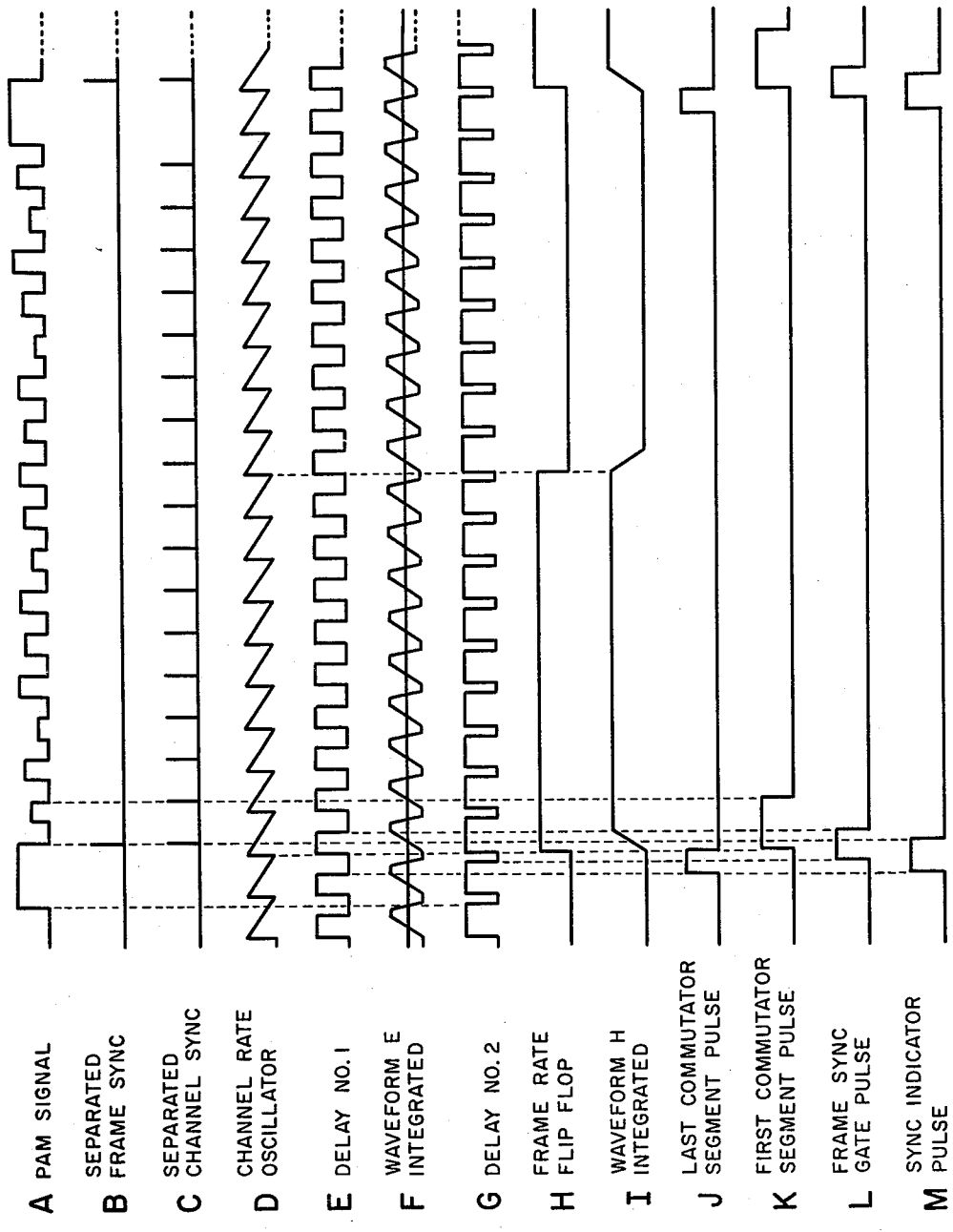

United States Patent Office 3,052,875
Patented Sept. 4, 1962

3,052,875
DECOMMUTATOR
Emory D. Heberling, Riverside, Calif., assignor to the United States of America, as represented by the Secretary of the Navy
Filed Oct. 2, 1961, Ser. No. 142,451
9 Claims. (Cl. 340—203)
(Granted under Title 35, U.S. Code (1952), sec. 266)

The invention described herein may be manufactured and used by or for the Government of the United States of America for governmental purposes without the payment of any royalties thereon or therefor.

The present invention relates to decommutators and in particular to a multi-channel telemetering synchronizing device.

This invention is a continuation-in-part of U.S. patent application Serial No. 830,162 filed July 28, 1959 now abandoned for Decommutator.

A decommutator is utilized to separate commutated or sequentially switched voltages and can be used to drive separate pen recording elements, for example, for plotting the separated channels of commutated data.

Decommutators in common use maintain synchronization with airborne telemetering commutators by utilizing pulses derived from individual data channel pulses, received from airborne or other devices, to trigger a sequential gate generator, such as a ring counter chain. A counter chain provides sequential gating pulses for the separation of individual data channels for monitoring and recording. A free-running multivibrator is usually provided which is triggered by separated channel sync pulses, and during dropout of the channel sync pulses due to noise or other cause provides for continued stepping of the sequential gate generator. However, these prior systems are not very satisfactory because after four or five missing channel sync pulses the multivibrator frequency drifts and the decommutator loses synchronization; also, such systems are adversely affected by noisy signals which cause erratic triggering of the sequential gate generator.

The present invention is an improvement over a decommutator disclosed in U.S. Patent No. 2,816,169 to M. G. Pawley which provides improved synchronization by the utilization of a local channel switching rate oscillator with automatic frequency control derived by comparison of the repetitive period of a ring counter chain with the period of the frame synchronizing pulse separated from the incoming commutated data waveform.

The decommutator of the present invention is an improvement over precious decommutators and provides simultaneously both frame and channel synchronization. In the present invention the period of a ring counter chain is compared with that of the separated frame sync pulse and the resulting error voltage combined with an error voltage derived by comparison of the period of separated channel syn pulses with the period of the local channel rate oscillator. The composite error voltage then provides automatic frequency control of the local channel rate oscillator.

It is an object of the invention therefore to provide a new and improved decommutator which simultaneously provides both frame and channel pulse synchronization.

Another object of the invention is to provide a novel multi-channel telemetering lock-in and synchronizing device which uses a composite of derived error voltages from both frame and channel sync pulses for automatic frequency control.

A further object of the invention is to provide a new and improved telemetering decommutator which speeds up recapture of synchronization after momentary loss thereof.

Other objects and many of the attendant advantages of this invention will be readily appreciated as the same becomes better understood by reference to the following detailed description when considered in connection with the accompanying drawings wherein:

FIGURE 2 illustrates pertinent waveforms describing a preferred implementation of the synchronizing scheme of the present invention.

Figure 1:
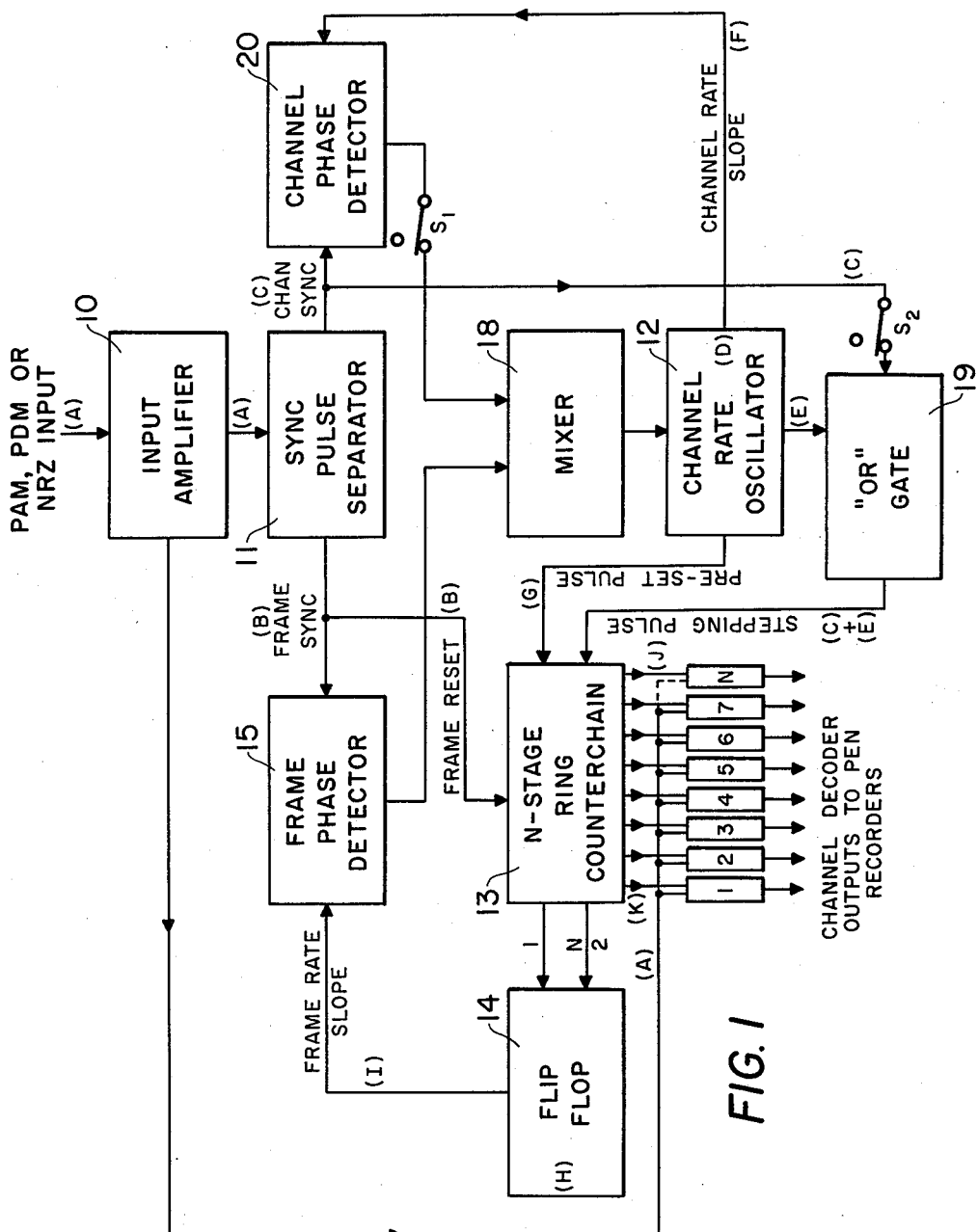
FIGURE 1 is a diagrammatic view of the decommutator of the present invention.

Referring to FIGURE 1, commutated input signals are fed through amplifier 10 to a sync pulse separator 11 in which frame sync and channel sync pulses are separated from the input waveform. Representative waveforms of amplifier input and output are shown at (A), FIGURE 2, with separated frame and channel trigger pulses shown at (B) and (C). An error-voltage-controlled channel rate oscillator 12, FIGURE 1, operates normally at a rate equal to the input signal channel switching rate and provides synchronized stepping pulses to an N-stage ring counter chain 13. The channel rate oscillator (phanastron) waveform is shown at (D), FIGURE 2. Waveforms (E) and (G) represent delayed signal sources, derived from the channel rate oscillator waveform (D), which maintain a proportional delay from the return excursion waevform of (D) during period (or frequency) variations of the oscillator. Such delays may be of the commonly used voltage comparator type and are included within the channel rate oscillator block 12 of FIGURE 1. The delayed signals correspond to the negative excursion of waveforms (E) and (G) of FIGURE 2.

The N-stage ring counter chain 13 of FIGURE 1 requires three external inputs and one internally connected reset pulse. During acquisition of synchronization the ring counter chain may be reset to channel one by either a frame sync pulse via the sync pulse separator 11 of FIGURE 1 or by an internal reset pulse from the last channel of the ring counter chain. When synchronization is accomplished counter chain reset occurs by means of the internal source alone. Not the time difference between (B) and (K), FIGURE 2. When synchronized the ring counter chain reset, by means of suitable gating devices included in block 13 of FIGURE 1, coincides with the return excursion of the channel rate oscillator waveform (D), FIGURE 2, and is unreceptive to a second reset by the separated frame sync waveform (B), FIGURE 2, for a time of approximately one channel period.

Channel stepping of the ring counter chain may be accomplished by a flip flop device also included within block 13 of FIGURE 1 requiring one pre-set trigger for each stepping trigger, by which multiple stepping triggers will result in only one step of the counter chain per pre-set impulse. In this way the stepping rate of the counter chain can not possibly exceed the channel oscillator rate, however, flexibility in the relative stepping time within a channel period is retained. Stepping may be initiated by the channel sync pulses (C), FIGURE 2, as they arrive. Following receipt of a pre-setting pulse from the channel rate oscillator 12 the counter chain 13 may be stepped one channel by either of the two input pulses to the "OR" gate 19, FIGURE 1. With switch $S_2$ closed a channel sync pulse will step the ring counter chain 13. If multiple pulses appear due to noise, the first one received after pre-set will step the ring counter once with no effect from erroneous following pulses. If the channel sync pulse is missing a false pulse is supplied later to the "OR" gate 19 from the synchronized channel rate oscillator 12 to keep the ring counter 13 in step. An alternate mode of decommutator operation is provided with S₂ open; in this mode the pre-setting pulse and the channel stepping pulse are derived continuously from the synchronized channel rate oscillator 12.

To provide automatic frequency control for the channel rate oscillator from separated frame sync pulses (B), FIGURE 2, a flip flop 14, FIGURE 1, is switched on at the ring counter reset time (H), FIGURE 2, resulting in a sloping edge (I), FIGURE 2, after integration, for phase comparison with the frame sync pulse of (B), FIGURE 1. Flip flop 14 of FIGURE 1 is returned to the normal state at the count N/2. When the system is out of synchronization by large percentages, error voltage sampling in the frame phase detector occurs on the limited flat top or bottom of waveform (I) of FIGURE 2, depending on whether the input frame period is shorter or longer, respectively, than the oscillator controlled frame period of the ring counter chain 13. D.C. error voltage of the proper polarity passes through mixer 18 to the channel rate oscillator 13, changing the frequency in the direction to provide a ring counter frame period equal to the input signal frame period. As the two periods become coincident phase lock occurs automatically when the frame sync sampling pulse reaches the center or half amplitude of the positive slope of waveform (I) for which it is seeking. An extremely wide frequency pull-in range is provided without erroneous reversal of error voltage polarity. Frame periods approaching ½ to 2 times the normal operating period may be readily accomodated.

The present invention further provides a means for speeding up capture of synchronization and maintaining sync without frame pulse information by means of an independent phase locked servo control utilizing the channel sync pulses (C) of FIGURE 2.

A sloping edge (F), FIGURE 2, for each channel is generated from the channel rate oscillator via waveform (E). The phase of separated channel sync pulses (C) are compared with the positive going slopes of (F) in the channel phase detector 20. Servo control of the channel rate oscillator is accomplished by transferring D.C. error voltage via the mixer to the channel rate oscillator in such polarity as to provide a phase lock seeking the center or half scale value of the positive slope of (F), FIGURE 2.

The frame and channel phase detectors 15 and 20 of FIGURE 1 may be similar to the commonly used four diode bridge switch, normally open with momentary closure by the sync pulse for transfer of D.C. error information to a suitable D.C. holding capacitor.

A commutator segment pulse for channel one is shown at (K), FIGURE 2. Similar gating pulses are available at the N-stage ring counter 13 for all data channels in the frame. Such synchronized gating pulses may be used to separate each channel of data from the composite input signal by means of the channel decoders or gates of FIGURE 1.

One feature is the capability of decommutation of 100% duty cycle commutated waveforms which do not always provide a form from which channel sync pulses can be derived. Since one mode of operation of the decommutator, with switch S₂ maintained in open position, synchronizes ring counter chain 13 solely from channel rate oscillator 12, synchronization of the decommutator is not dependent solely upon separation of channel sync pulses. This is a feature not provided in previously available decommutators, and this mode of operation is optionally provided in the present invention.

A novel portion of this invention is the provision in the circuitry of a second phase detector 20 which compares the period of the separated channel sync pulses from sync pulse separator 11 with the period of channel rate oscillator 12 and thus provides correction to this oscillator frequency at the channel rate; the channel rate being N times faster than the frame rate. The combination of channel sync pulse separator 11 and channel phase detector 20 along with the other circuitry speeds up recapture of synchronization of channel rate oscillator 12 following momentary loss of synchronization.

The present invention may also be used to provide an IN-SYNC indicator pulse. The operation of this feature is shown by (L) and (M), FIGURE 2. The state of synchronization at the start of each new frame is determined by a coincidence detector operating over a restricted range within which the incoming frame pulse must fall for proper synchronization. The gating pulse (L) is derived during portions of the last and first ring counter channel periods and insures that the last ring counter pulse is in the proper place before an "in-sync" indication is given for the next frame. An indicator flip flop (M) is turned "off" during each last ring counter pulse and remains off until a frame coincidence pulse is received through the restrictive gate (L).

If synchronization is lost waveform (M), FIGURE 2, remains in a positive state until synchronization is restored.

When the system is out of synchronization, one mode of operation provides that switch S₁ be electronically closed permitting fast channel sync pulse correction of channel rate oscillator 12. As soon as frame sync is re-established, switch S₁ is electronically opened. This system would prevent noisy separated channel sync pulses from supplying incorrect error voltage to channel rate oscillator 12 when the system is already in synchronization by virtue of frame period servo correction.

Obviously many modifications and variations of the present invention are possible in the light of the above teachings. It is therefore to be understood that within the scope of the appended claims the invention may be practiced otherwise than as specifically described.

What is claimed is:

1. A multi-channel telemetering synchronizing device comprising:
   (a) an input means,
   (b) a synchronizing pulse separator connected to said input means for separating frame sync and channel sync pulses from an input signal,
   (c) a frame pulse phase detector connected to said synchronizing pulse separator for receiving separated frame pulses,
   (d) a channel pulse phase detector connected to said synchronizing pulse separator for receiving separated channel sync pulses,
   (e) a multi-stage ring counter chain being connected to said synchronizing pulse separator through a gate means for receiving separated channel sync pulses,
   (f) said ring counter chain also being connected to said synchronizing pulse separator for reicing frame sync pulses,
   (g) said ring counter chain being normally stepped at the channel pulse rate by means of the separated channel sync pulses,
   (h) said ring counter chain also being connected to a flip-flop circuit which in turn is connected to said frame pulse phase detector,
   (i) said frame phase detector and said channel phase detector each being connected to an error-voltage-controlled channel rate oscillator through a mixer,
   (j) said flip-flop circuit providing automatic frequency control for said channel rate oscillator, said flip-flop frequency control being turned on at the first channel count and turned off at the middle channel count and producing an error voltage in such polarity as to correct the frequency of said channel rate oscillator when the system is out of synchronization and the period of said flip-flop waveform becomes different from that of the separated frame pulse,
   (k) said channel rate oscillator also being connected to said gate means,
   (l) said gate means being operable to switch connection of said ring counter chain from said synchronizing pulse separator to said channel rate oscillator when said channel sync pulses drop out to provide synchronizing pulses for stepping said ring counter chain, (m) said channel rate oscillator also being connected to said ring counter chain for providing a pre-set pulse thereto, (n) said ring counter chain providing sequential gating pulses for separation and monitoring of individual data channels, (o) simultaneous frame pulse and channel pulse synchronization being provided for said channel rate oscillator by means of the separate and independent frame phase and channel phase detectors whose outputs are combined to provide a single error correction voltage for the channel rate oscillator which in turn is used to separate information channels by means of said counter chain.

2. A multi-channel telemetering synchronizing device comprising:

(a) an input means, (b) a synchronizing pulse separating means connected to said input means for separating frame sync and channel sync pulses from an input signal, (c) a first phase detector connected to said synchronizing pulse separating means for receiving separated frame pulses, (d) a second phase detector connected to said synchronizing pulse separating means for receiving separated channel sync pulses, (e) a multi-stage ring counter chain being connected to said synchronizing pulse separating means through a gate means for receiving separated channel sync pulses, (f) said ring counter chain also being connected to said synchronizing pulse separating means for receiving frame sync pulses, (g) said ring counter chain being normally stepped at the channel pulse rate by means of the separated channel sync pulses, (h) said ring counter chain also being connected to a flip-flop circuit which in turn is connected to said first phase detector, (i) said first phase detector and said second phase detector each being connected to an error voltage controlled channel rate oscillator through a mixer, (j) said flip-flop circuit providing automatic frequency control for said channel rate oscillator, (k) said channel rate oscillator also being connected to said gate means, (l) said gate means being operable to switch connection of said ring counter chain from said synchronizing pulse separating means to said channel rate oscillator when said channel sync pulses drop out to provide synchronizing pulses for stepping said ring counter chain, (m) said ring counter chain providing sequential gating pulses for separation and monitoring of individual data channels, (n) simultaneous frame pulse and channel pulse synchronization being provided for said channel rate oscillator by means of the separate and independent first and second phase detectors respectively whose outputs are combined to provide a single error correction voltage for the channel rate oscillator which in turn is used to separate information channels by means of said counter chain.

3. A device as in claim 2 wherein said flip-flop frequency control is turned on at the first channel count and turned off at the middle channel count and produces an error voltage in such polarity as to correct the frequency of said channel rate oscillator when the system is out of synchronization and a period of said flip-flop waveform becomes different from that of the separated frame pulse.

4. A device as in claim 2 wherein automatic frequency control of the channel rate oscillator is derived by comparison of the repetitive period of the ring counter chain with the period of the separated frame sync pulses.

5. A device as in claim 2 wherein a switch means is provided in the connection between said second phase detector and said mixer, synchronization of said channel rate oscillator being acquired from frame pulse information alone when said switch is open, and synchronization of said channel rate oscillator being acquired by the combination of frame and channel pulse information when said switch is closed.

6. A device as in claim 2 wherein a switch means is provided in the connection between said second phase detector and said mixer, synchronization of said channel rate oscillator being maintained from frame pulse information alone when said switch means is open, synchronization of said channel rate oscillator being maintained from a combination of frame and channel pulse information when said switch means is closed, and synchronization of said channel rate oscillator being maintained from channel pulse information alone when said switch means is closed and the frame pulse is missing from the input signal.

7. A device as in claim 2 wherein a normally open switch means is provided in the connection between said second phase detector and said mixer, said switch means operable to be closed whenever the pulse from the last stage of said ring counter chain is not coincident with the frame sync pulse permitting fast channel sync pulse correction of the channel rate oscillator, said switch means also being operable to be opened whenever frame synchronization is re-established, thus providing an IN-SYNC indicator pulse and preventing noisy separated channel sync pulses from supplying incorrect error voltage to said channel rate oscillator when the system is already in synchronization by virtue of frame period servo correction.

8. A multi-channel telemetering synchronizing device comprising:

(a) an input means, (b) a synchronizing pulse separating means connected to said input means, (c) a first phase detector connected to receive separated frame sync pulses from said pulse separating means, (d) a second phase detector connected to receive separated channel sync pulses from said pulse separating means, (e) means for providing sequential gating pulses for the separation of individual data channels from input signals, (f) switching means normally connecting said gating pulse means to receive the separated channel sync pulses from said pulse separating means, (g) said gating pulse means being normally stepped at the channel pulse rate by the separated channel sync pulses, (h) a local channel rate oscillator connected to said second phase detector and to said switching means, (i) said gating pulse means also being connected to a flip-flop circuit, (j) said flip-flop circuit in turn being connected to said first phase detector and providing automatic frequency control for said channel rate oscillator, and said first phase detector being connected to said rate oscillator, (k) said switching means operable to switch connection of said gating pulse means from receiving the separated channel sync pulses to said channel rate oscillator whenever the channel sync pulses drop out, (l) said channel rate oscillator normally operating at a rate equal to the channel sync pulse rate and operable to provide synchronizing pulses to step said gating pulse means whenever connected thereto, (m) simultaneous frame and channel pulse synchronization being provided by comparing the period of the gating pulse means with that of the separated frame sync pulses and combining the resulting error voltage with an error voltage derived by comparison of the period of separated channel sync pulses with the period of the local channel rate oscillator, the composite error voltage providing automatic frequency control of the local channel rate oscillator.

9. A device as in claim 8 wherein said flip-flop frequency control is turned on at the first channel count and turned off at the middle channel count and produces an error voltage in such polarity as to correct the frequency of said channel rate oscillator when the system is out of synchronization and the period of said flip-flop waveform becomes different from that of the separated frame pulse.

No references cited.